United States Patent
Gourdol

(10) Patent No.: US 8,051,377 B1
(45) Date of Patent: Nov. 1, 2011

(54) METHOD AND APPARATUS FOR DISPLAYING MULTIPLE PAGE FILES

(75) Inventor: Arno Gourdol, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1075 days.

(21) Appl. No.: 11/218,183

(22) Filed: Aug. 31, 2005

(51) Int. Cl.
*G06F 3/00* (2006.01)

(52) U.S. Cl. ......... 715/730; 715/732; 715/833; 715/204

(58) Field of Classification Search .................. 715/730, 715/732, 833, 204
See application file for complete search history.

(56) References Cited

U.S. PATENT DOCUMENTS

| | | | |
|---|---|---|---|
| 7,266,568 B1 * | 9/2007 | Erol et al. .............................. | 1/1 |
| 2002/0026521 A1 * | 2/2002 | Sharfman et al. .............. | 709/231 |
| 2002/0186258 A1 * | 12/2002 | Shibata ......................... | 345/838 |
| 2003/0001904 A1 * | 1/2003 | Rosen et al. ................... | 345/848 |
| 2003/0016233 A1 * | 1/2003 | Charpentier ................... | 345/619 |
| 2003/0085913 A1 * | 5/2003 | Ahmad et al. ................. | 345/730 |
| 2003/0145023 A1 * | 7/2003 | Bennett et al. ................ | 707/205 |
| 2004/0095379 A1 * | 5/2004 | Chang et al. .................. | 345/727 |
| 2004/0113934 A1 * | 6/2004 | Kleinman et al. ............. | 345/732 |
| 2004/0255232 A1 * | 12/2004 | Hammond et al. ........... | 715/500 |
| 2005/0033769 A1 * | 2/2005 | Mifune ....................... | 707/104.1 |
| 2005/0135793 A1 * | 6/2005 | Mindrum et al. .............. | 386/125 |
| 2005/0155086 A1 * | 7/2005 | Schick et al. ................. | 725/153 |
| 2005/0240865 A1 * | 10/2005 | Atkins et al. .................. | 715/517 |
| 2006/0048058 A1 * | 3/2006 | O'Neal et al. ................. | 715/730 |

OTHER PUBLICATIONS

Sistrom et al.; A Simple Method for Importing Multiple Image Files into PowerPoint; Revision Nov. 20, 2003; http://www.ajronline.org/cgi/content/full/182/6/1591.*
Active_Slideshow_PRO Manual; CopyRight 2005; http://www.dmxzone.com/Downloads/Tutorial_ActSlideShowPro.zip/Active_Slideshow_PRO.pdf; 20 pages.*
A Simple Method for Importing Multiple Image Files into PowerPoint; Sistrom1 et al., Oct. 23, 2003; 11 pages; http://www.ajronline.org/cgi/content/full/182/6/1591.*

* cited by examiner

*Primary Examiner* — Steven Sax
*Assistant Examiner* — Linh Pham
(74) *Attorney, Agent, or Firm* — Robert C. Kowert; Meyertons, Hood, Kivlin, Kowert & Goetzel, P.C.

(57) ABSTRACT

Embodiments for displaying multiple page files are disclosed. In an example embodiment, a plurality of files may be automatically displayed. For the respective files of the plurality of files, a count of pages may be determined, and at least one of the pages of the file may be displayed. If the count of pages is determined to be greater than one, a plurality of pages of the file may be automatically displayed.

32 Claims, 4 Drawing Sheets

METHOD AND APPARATUS FOR DISPLAYING MULTIPLE PAGE FILES

FIELD

This application pertains to the field of digital media, and more particularly, to the field of displaying multiple page files.

BACKGROUND

It is becoming increasingly popular to view images stored in files on computing platforms or other types of electronic devices. For example, it is common for a user to download images from a digital camera onto a computer and then view the images on the computer system's display monitor. A user may select individual images to be displayed one at a time, or may also set up what may be referred to as a "slideshow" where a number of specified images are displayed sequentially. Transitions such as dissolves, fades, or wipes may be utilized when switching from one image to another in order to add interest to the slideshow.

BRIEF DESCRIPTION OF THE DRAWINGS

The claimed subject matter will be understood more fully from the detailed description given below and from the accompanying drawings of embodiments which should not be taken to limit claimed subject matter to the specific embodiments described, but are for explanation and understanding only.

DETAILED DESCRIPTION

Figure 1:
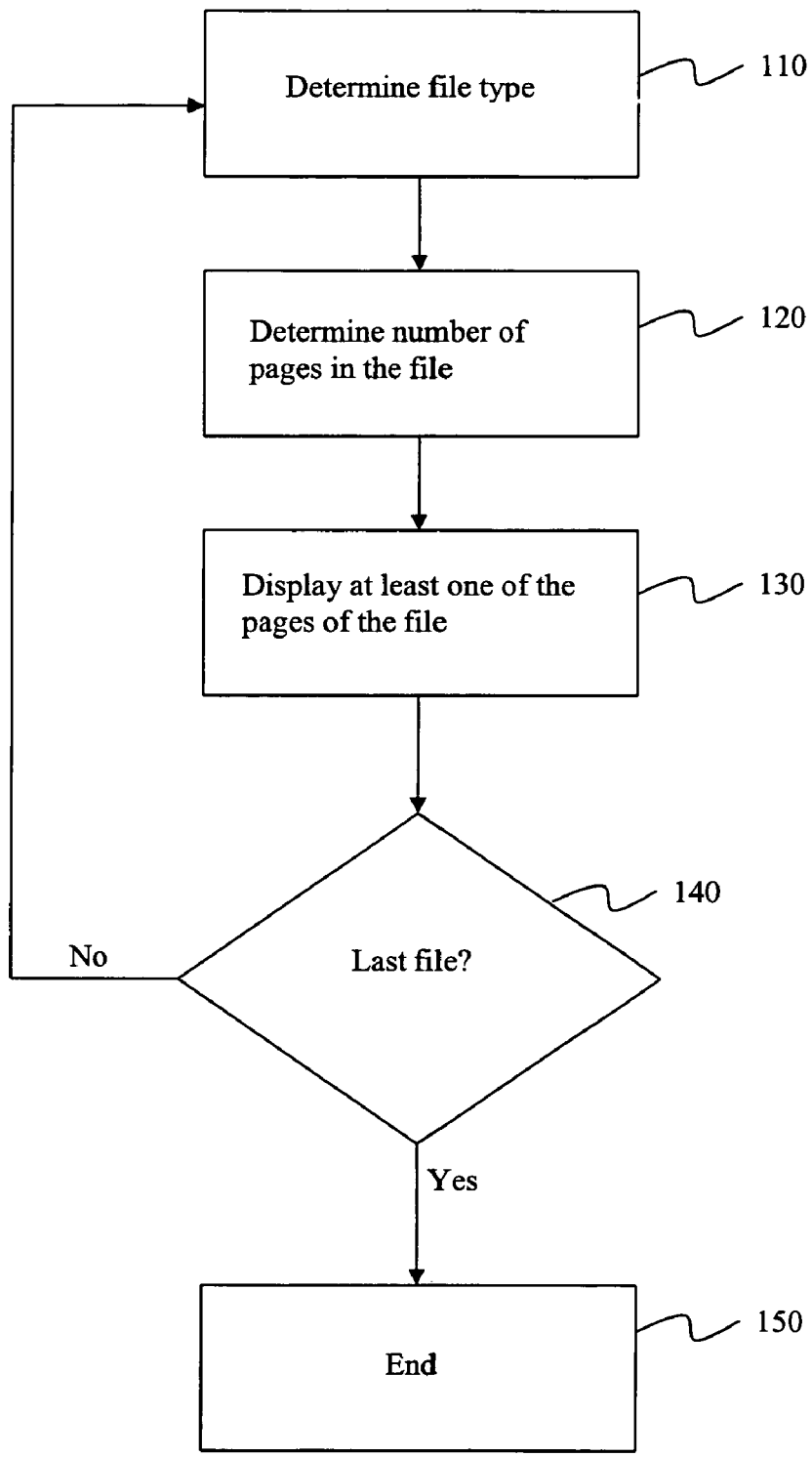
FIG. 1 is a flow diagram of an example embodiment of a method for displaying multiple page files.

FIG. 1 is a flow diagram of an example embodiment of a method for displaying multiple page files. For this example embodiment, a number of files may be selected, perhaps by a user, for display using a computing platform. The computing platforms discussed herein may comprise any of a wide range of electronic device types that are capable of executing instructions, including, but not limited to, personal computers, notebook computers, server computers, personal digital assistants, game consoles, cellular phones, household appliances, automobiles, etc. The files may include any of a wide variety of image or document types, and the files may be formatted according to any of a wide range of file formats. The various files selected for display may comprise various file types. For example, one of the files may comprise a Portable Document File (PDF), another file may comprise a Joint Photographic Experts group (JPEG) image, and another file may comprise an Adobe® Photoshop® file format (PSD). These are merely examples of file types, and the claimed subject matter is not limited to these file types. Further, the embodiments discussed herein are not limited to displaying photographic images. Other embodiments are possible using any of a wide range of digital content types for display. Any digital content capable of being displayed by a display device may be used with the example embodiments described herein. For example, one embodiment may display digital photographic images, word processing documents, and/or drawings creating using a software agent such as, for example, Adobe® Illustrator®. The files to be displayed may comprise a single page, or may comprise a plurality of pages. As used herein, the term "page" may refer to a single image and/or to one page of a document. For example, a JPEG file may comprise a single image. This JPEG file may be said to comprise one page. As another example, a PDF file may be divided into a number of pages, and each page may include one or more images, drawings, text, and/or other content. This PDF file may be said to comprise multiple pages. Further, for the embodiments described herein, the files may be displayed automatically. That is, the files may be displayed without further user input.

For this example embodiment, processing may begin at block 110 where for one of the selected files a file type is determined. As previously mentioned, any of a wide range of file types may be included in this example. At block 120, the number of pages for the file is determined. At block 130, at least one of the pages of the file are displayed. The pages may be displayed one-after-the-other in a sequential manner. Other embodiments may provide for displaying more than one page at a time. Pages for this example may be displayed in a predetermined order, or may be displayed in a random (or pseudo random) order.

At block 140, a determination is made as to whether the current file is the last file selected for display. If not, processing returns to block 110, and a next file is processed and displayed. If the current file is the last file selected for display, processing ends at block 150. The method of FIG. 1 may include all, more than all, and/or less than all of blocks 110-150, and furthermore the order of blocks 110-150 is merely an example order, and the scope of the claimed subject matter is not limited in this respect.

The above example, and the other example embodiments discussed below, may be implemented as part of a software agent that when executed on a computing platform provides "slideshow" functionality. The term "slideshow" as used herein is meant to denote an automated display of a plurality of files. The slideshow may include a plurality of images displayed in a sequential manner. For some embodiments, pages may be displayed one-at-a-time, and for other embodiments more than one page may be displayed at a time. The software agent may be responsive to input from a user. For example, a user may perform a keystroke or select an icon using a pointing device in order to alter the behavior of a slideshow. For example, a user may press a key causing the software agent to stop displaying images from one file and to begin displaying the next file. The user may also indicate to the software agent to stop the slideshow, or may select additional files for display, or may change the speed of the slideshow, or may select transition effects, etc.

Also for the example embodiments described herein, transition effects such as dissolves, fades, wipes, etc. may be used when switching from the display of one page to another page. These transition effects may be automatically inserted into the slideshow, or may be specified in the files to be displayed. For one embodiment, a user may specify which transition effects to use by selecting options within the software agent user interface.

Figure 2:
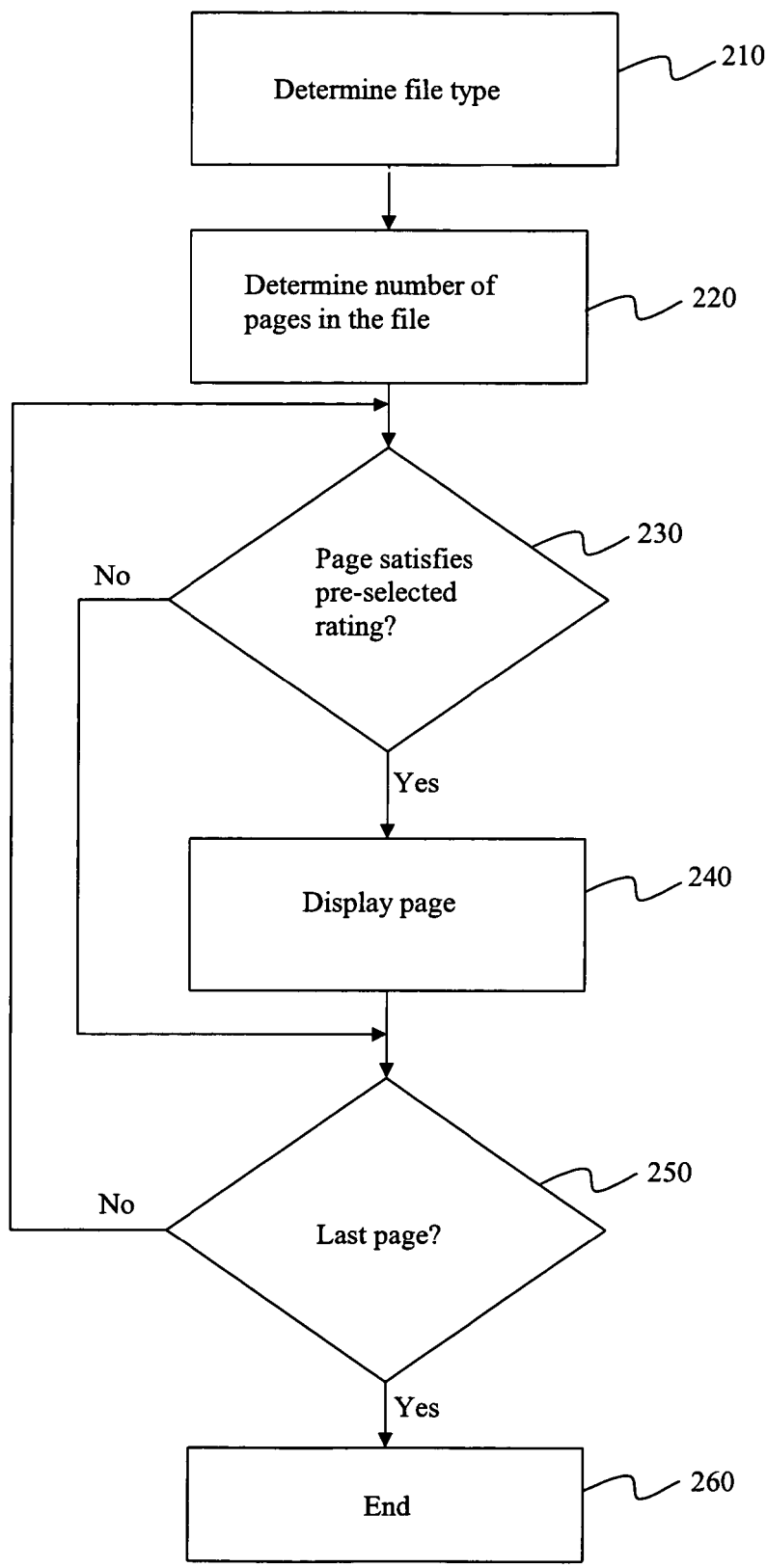
FIG. 2 is a flow diagram of an example embodiment of a method for displaying multiple page files including image ratings.

FIG. 2 is a flow diagram of an example embodiment of a method for displaying multiple page files including image ratings. For some embodiments, files may be rated according to any of a wide range of attributes. For example, a user may rate image files based on image quality, subject matter, etc. For example, a user may assign a "5" to favorite images and may assign "1" to images that are net favorites. This is merely one example, and the claimed subject matter is not limited in this respect.

As with the example above discussed in connection with FIG. 1, a number of files are selected for display. A user may select the files manually, or some other automated algorithm may be used to select the files for display. For example, a user may indicate that files from a particular directory are to be displayed. A user may also specify that only files that satisfy a pre-selected rating criterion are to be displayed. Examples of possible criteria may include file creation date, user rankings such as those discussed above, file name, file size, file type, image type, etc.

At block 210, a file type for a first file is determined. At block 220, the number of pages included in the current file are determined. For each page in the file, a determination is made as to whether the page meets or exceeds the pre-selected rating criteria. If the rating criteria are satisfied, the page is displayed at block 240. At block 250, a determination is made at to whether the current page is the last page. If not, processing returns to block 230 and the next page may be processed. If the current page is the last page, processing ends at block 260. The above algorithm may be repeated for each file selected for display. The method of FIG. 2 may include all, more than all, and/or less than all of blocks 210-260, and furthermore the order of blocks 210-260 is merely an example order, and the scope of the claimed subject matter is not limited in this respect.

Figure 3:
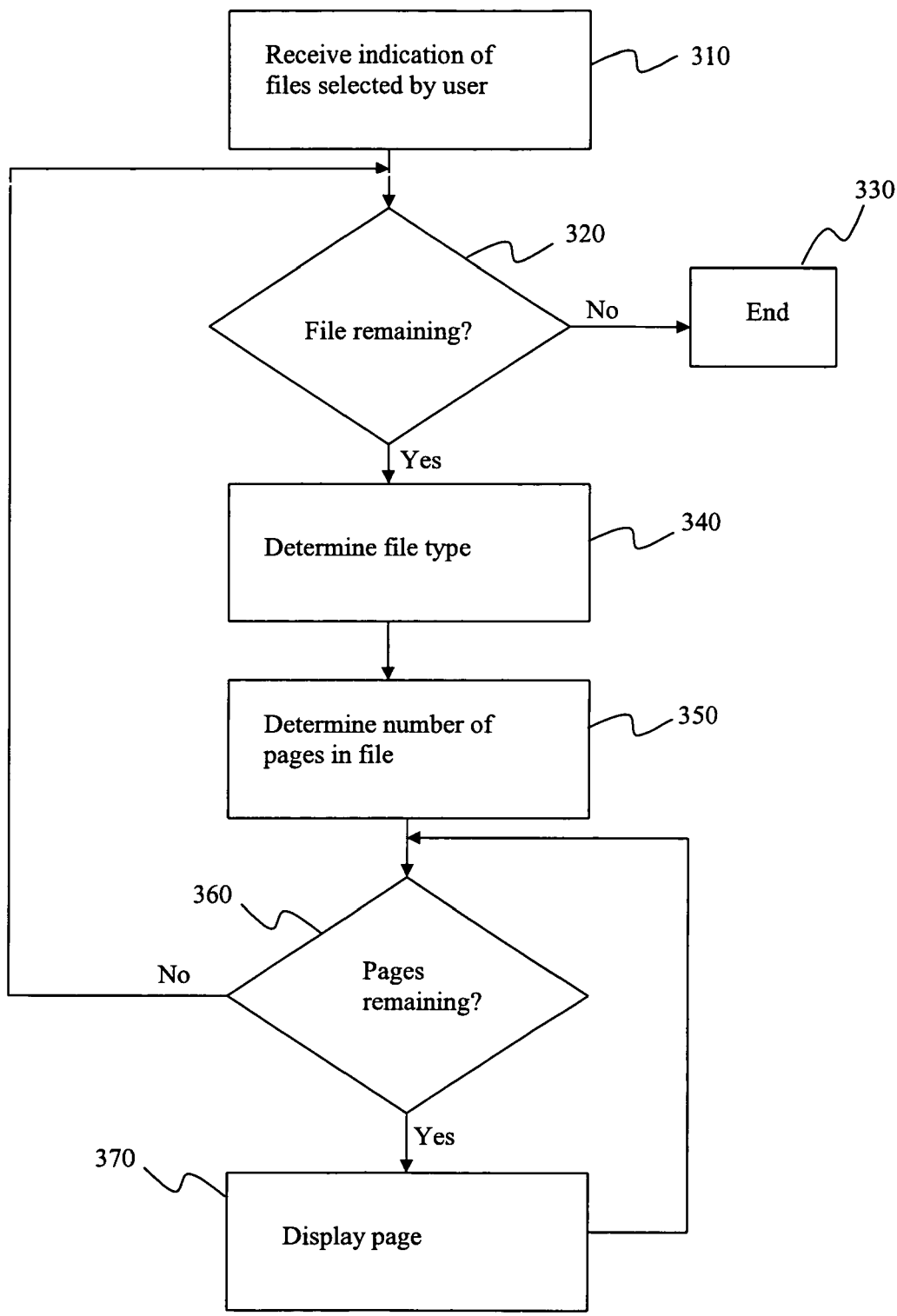
FIG. 3 is a flow diagram of an example embodiment of a method for displaying multiple page files selected by a user.

FIG. 3 is a flow diagram of an example embodiment of a method for displaying multiple page files selected by a user. At block 310, an indication is received from a user indicating which files have been selected for display. The user may select the files in any manner, including selecting files using a pointing device such as a mouse. At block 320, a determination is made as to whether there are files remaining that are to be displayed. If no files remain, processing ends at block 330. Otherwise, at block 340 a file type for a current file is determined. At block 350, the number of pages within the file is determined. As depicted at block 360, if any pages within the current file remain to be displayed, a page is displayed at block 370. If all of the pages of the current file have been displayed, processing returns to block 320 where another determination is made as to whether any files remain to be displayed.

It is appreciated that throughout this specification discussions utilizing terms such as "processing," "computing," "calculating," "selecting," "forming," "enabling," "inhibiting," "identifying," "initiating," "receiving," "transmitting," "determining" and/or the like refer to the actions and/or processes that may be performed by a computing platform, such as a computer or other electronic device, that manipulates and/or transforms data represented as physical electronic and/or magnetic quantities and/or other physical quantities within the computing platform's processors, memories, registers, and/or other information storage, transmission, reception and/or display devices. Further, processes described herein, with reference to flow diagrams or otherwise, may also be executed and/or controlled, in whole or in part, by such a computing platform.

Figure 4:
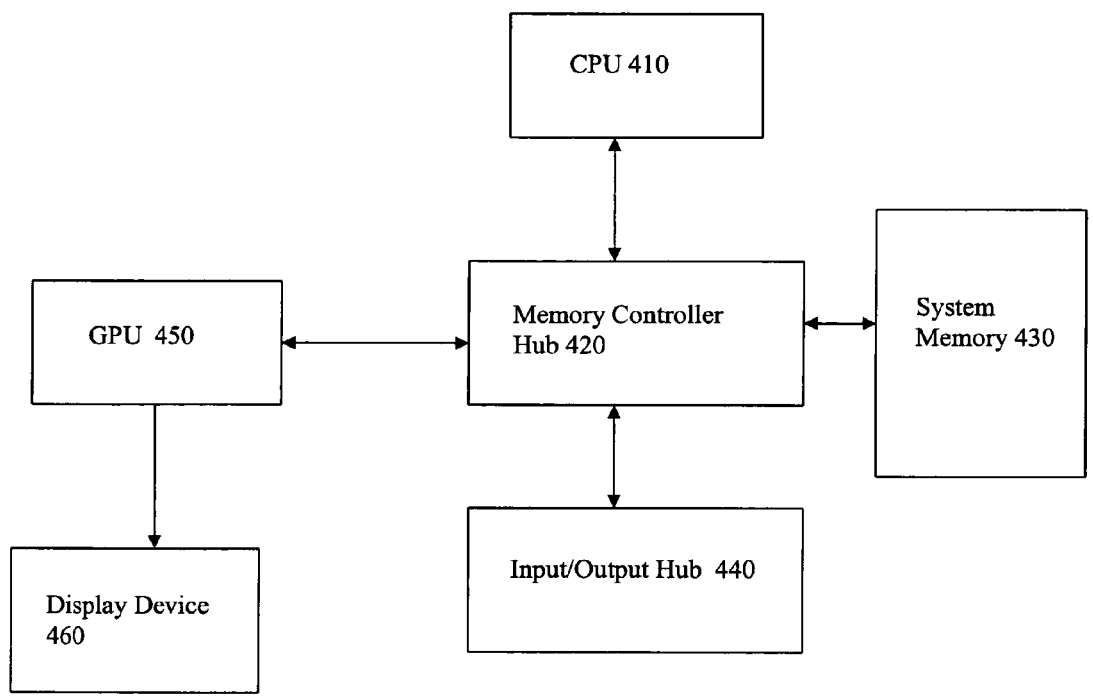
FIG. 4 is a block diagram of an example embodiment of a computing platform for displaying multiple page files.

FIG. 4 is a block diagram of an example computer system 400. The term "computer system" as used herein is meant to include any electronic device capable of executing software, firmware, and/or hardwired instructions. System 400 may be used to perform some or all of the various functions discussed above in connection with FIGS. 1-3. System 400 includes a central processing unit (CPU) 410 and a memory controller hub 420 coupled to central processing unit (CPU) 410.

Memory controller hub 420 is further coupled to a system memory 430, to a graphics processing unit (GPU) 450, and to an input/output hub 440. GPU 450 is further coupled to a display device 460, which may comprise a CRT display, a flat panel LCD di splay, or other type of display device. System 400 may also include a device (not shown) to read media such as compact discs, digital versatile discs, or other type of media. Although example system 400 is shown with a particular configuration of components, other embodiments are possible using any of a wide range of configurations.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

In the foregoing specification claimed subject matter has been described with reference to specific example embodiments thereof. It will, however, be evident that various modifications and/or changes may be made thereto without departing from the broader spirit and/or scope of the subject matter as set forth in the appended claims. The specification and/or drawings are, accordingly, to be regarded in an illustrative rather than in a restrictive sense.

What is claimed is:

1. A method for generating a slideshow, comprising:
performing by a computer:
receiving a selection of a plurality of files to be displayed as slides in the same slideshow, wherein two or more of the selected plurality of files have different file types, and wherein at least one of the selected plurality of files is a multi-page file, and at least one of the selected plurality of files is a single page file;
automatically generating the slideshow from the selected plurality of files including the two or more files having different file types and the at least one multi-page file and the at least one single page file, wherein one of the different file types is an image file type or a portable document format file type, wherein for each respective file of the selected plurality of files, said automatically generating includes displaying the slides based on the selected files in a sequential order, wherein said displaying comprises, for each file:
determining a file type for the file;
if the file type is determined to support multiple pages, displaying at least one of the pages of the file in the slideshow according to the sequential order, wherein each displayed page is displayed as a separate slide;
if the file type is determined to not support multiple pages, displaying the file as one of the slides in the slideshow according to the sequential order, wherein the image file type is determined to not support multiple pages;
displaying a transition between two pages from the multi-page file in the slideshow if a count of pages is determined to be greater than one.

2. The method of claim 1, wherein said automatically generating the slideshow further comprises displaying a transition between slides for two files.

3. The method of claim 1, wherein said displaying at least one of the pages of the file comprises displaying a transition between slides for two pages of the file.

4. A method, comprising:
performing by a computer:
receiving a selection of a plurality of files to be displayed as slides in the same slideshow, wherein two or more of the selected plurality of files have different file types, and wherein at least one of the selected plurality of files is a multi-page file, and at least one of the selected plurality of files is a single page file;

automatically generating the slideshow from the selected plurality of files including the two or more files having different file types and the at least one multi-page file and the at least one single page file, wherein one of the different file types is an image file type or a portable document format file type, wherein for each file of the selected plurality of files, said automatically generating includes:

determining a file type for the file;

if the file type is determined to support multiple pages, determining a count of pages in the file, and if the count is greater than one, determining for each page if the page satisfies a pre-selected rating criterion, and including the page in the slide show only if the page is determined to satisfy the preselected rating criterion; and if the file type is determined to not support multiple pages, including the file in the slideshow as one of the slides, wherein the image file type is determined to not support multiple pages.

5. The method of claim 4, wherein said automatically generating the slideshow from the selected plurality of files comprises displaying a single page file of a first file type and further displaying a multiple page file of a second file type in the same slideshow.

6. The method of claim 5, wherein the second file type is comprises a portable document format file type.

7. A method, comprising:

performing by a computer:

receiving an indication from a user to display a plurality of indicated files in a slideshow, wherein two or more of plurality of indicated files have different file types, and wherein at least one of the indicated files is a multi-page file, and at least one of the selected plurality of files is a single page file; and automatically generating the slideshow from the plurality of indicated files including the two or more files having different file types and the at least one multi-page file and the at least one single page file, wherein one of the different file types is an image file type or a portable document format file type, wherein said automatically generating comprises for each respective file of the plurality of indicated files:

determining a file type for a the file;

if the file type is determined to support multiple pages, determining a count of pages in the file, and if the count is greater than one, including in a sequential manner one or more pages of the file in the slideshow; and if the file type is determined to not support multiple pages, including the file as a single slide in the slideshow, wherein the image file type is determined to not support multiple pages;

including a transition in the slideshow between two pages of the multi-page file if the count of pages is determined to be greater than one.

8. The method of claim 7, further comprising:

stopping display of a first of the plurality of indicated files and displaying a second of the plurality of indicated files in response to a selection by a user.

9. The method of claim 7, wherein said displaying in a sequential manner further comprises stopping display of a first image of the file and displaying a second image of the file in response to a selection by a user.

10. The method of claim 7, wherein said displaying in a sequential manner further comprises displaying a transition between two of the pages of the file.

11. An article, comprising: a non-transitory storage medium having stored thereon instructions executable by a computing platform to:

receive a selection of a plurality of files to be displayed as slides in a same slideshow, wherein two or more of the selected plurality of files have different files types, and wherein at least one of the selected plurality of files is a multi-page file, and at least one of the selected plurality of files is a single page file; and automatically generate the slideshow from the selected plurality of files including the two or more files having different file types and the at least one multi-page file and the at least one single page file, wherein one of the different file types is an image file type or a portable document format file type, wherein for each respective file of the plurality of files, said automatically generate includes displaying the slides based on the selected files in a sequential order, wherein said displaying comprises, for each file:

determining a file type for the file;

if the file type is determined to support multiple pages, displaying at least one of the pages in the file in the slideshow according to the sequential order, wherein each displayed page is displayed as a separate slide; and if the file type is determined to not support multiple pages, displaying the file as one of the slides in the slideshow according to the sequential order, wherein the image file type is determined to not support multiple pages;

displaying a transition between two pages from the multi-page file in the slideshow if a count of pages is determined to be greater than one.

12. The article of claim 11, wherein the storage medium has stored thereon further instructions executable by the computing platform to display generate the slideshow from the plurality of files by displaying a first file of a first file type and by further displaying a second file of a second file type.

13. The article of claim 12, wherein the first file type comprises a single page file type and the second file type comprises a multiple page file type.

14. The article of claim 13, wherein the second file type comprises a portable document format file type.

15. The article of claim 11, wherein the storage medium has stored thereon further instructions executable by the computing platform to automatically generate the slideshow from a plurality of files by displaying a transition between two files.

16. The article of claim 11, wherein the storage medium has stored thereon further instructions executable by the computing platform to display at least one of the pages of the file by displaying a transition between two pages of the file if the count of pages is determined to be greater than one.

17. An article, comprising: a non-transitory storage medium having stored thereon instructions executable by a computing platform to:

receive a selection of a plurality of files to be displayed as slides in the same slideshow, wherein two or more of the selected plurality of files have different files types, and wherein at least one of the selected plurality of files is a multi-page file, and at least one of the selected plurality of files is a single page file; and automatically generate the slideshow from the selected plurality of files including the two or more files having different file types and the at least one multi-page file and the at least one single page file, wherein one of the different file types is an image file type or a portable document format file type, wherein for each file of the selected plurality of files, said automatically generate includes:

determining a file type for the file;

if the file type is determined to support multiple pages, determining a count of pages in the file, and if the count is greater than one, determining for each page if the page satisfies a pre-selected rating criterion, and including the page in the slideshow if the page is determined to satisfy the pre-selected rating criterion; and if the page is determined not to support multiple pages, including the file in the slideshow as one of the slides, wherein the image file type is determined to not support multiple pages.

18. The article of claim 17, wherein the storage medium has stored thereon further instructions executable by the computing platform to automatically generate the slideshow from a plurality of files by displaying a single page file of a first file type and further displaying a multiple page file of a second file type, wherein said displaying the multiple page file of the second file type comprises automatically displaying a plurality of pages of the multiple page file if the count of pages is determined to be greater than one and if the plurality of pages satisfies the preselecting rating criterion.

19. The article of claim 18, wherein the second file type comprises a portable document format file type.

20. An article, comprising: a storage medium having stored thereon further instructions executable by a computing platform to:

receive an indication from a user to display a plurality of indicated files in a slideshow, wherein two or more of plurality of indicated files have different file types, and wherein at least one of the plurality of indicated files is a multi-page file, and at least one of the selected plurality of files is a single page file; and automatically generate the slideshow from the plurality of indicated files including the two or more files having different file types and the at least one multi-page file and the at least one single page file, wherein one of the different file types is an image file type or a portable document format file type, wherein said automatically generate comprises for each respected file of the plurality of indicated files:

determining a file type for the file, if the file type is determined to support multiple pages, determining a count of pages in the file, and if the count is greater than one, including in a sequential manner one or more pages of the file in the slideshow; and if the file type is determined to not support multiple pages, including the file as a single slide in the slideshow, wherein the image file type is determined to not support multiple pages;

including a transition in the slideshow between two pages of the multi-page file if the count of pages is determined to be greater than one.

21. The article of claim 20, wherein the storage medium has stored thereon further instructions executable by the computing platform to:

stop display of a first of the plurality of indicated files and display a second of the plurality of indicated files in response to a selection by a user.

22. The article of claim 20, wherein the storage medium has stored thereon further instructions executable by the computing platform to:

stop display of a first image of the file and display a second image of the file in response to a selection by a user.

23. The article of claim 20, wherein the storage medium has stored thereon further instructions executable by the computing platform to display in a sequential manner the plurality of pages of the file if the count of pages is determined to be greater than one further comprises displaying a transition between two of the pages of the file.

24. An apparatus, comprising:

one or more processors configured to:

receive a selection of a plurality of files to be displayed as slides in the same slideshow, wherein two or more of the selected plurality of files have different file types, and wherein at least one of the selected plurality of files is a multi-page file, and at least one of the selected plurality of files is a single page file; and automatically generate a slideshow from the selected plurality of files, including two or more files having different file types and the at least one a multi-page file and the at least one single page file, wherein one of the different file types is an image file type or a portable document format file type, wherein for each respective file of the selected plurality of files, said automatically generate includes displaying the slides based on the selected files in a sequential order, wherein said displaying comprises, for each file:

determining a file type for the file;

if the file type is determined to support multiple pages, displaying at least one of the pages of the file in the slideshow according to the sequential order, wherein each displayed page is displayed as a separate slide; and if the file type is determined to not support multiple pages, displaying the file as one of the slides in the slideshow according to the sequential order, wherein the image file type is determined to not support multiple pages;

displaying a transition between two pages from the multi-page file in the slideshow if a count of pages is determined to be greater than one.

25. An apparatus, comprising:

one or more processors configured to:

receive a selection of a plurality of files to be displayed as slides in the same slideshow, wherein two or more of the selected plurality of files have different file types, and wherein at least one of the selected plurality of files is a multi-page file, and at least one of the selected plurality of files is a single page file; and automatically generate a slideshow from the selected plurality of files, including the two or more files having different file types and the at least one multi-page file and the at least one single page file, wherein one of the different file types is an image file type or a portable document format file type, wherein for each respective file of the selected plurality of files, said automatically generating includes:

determining a file type for the file;

if the file type is determined to support multiple pages, determining a count of pages in the file, and if the count is greater than one, determining for each page if the page satisfies a preselected rating criterion, and including the page in the slide show only if the page is determined to satisfy the preselected rating criterion; and if the file type is determined to not support multiple pages, including the file in the slideshow as one of the slides, wherein the image file type is determined to not support multiple pages.

26. An apparatus, comprising:

one or more processors configured to:

receive an indication from a user to display a plurality of indicated files in a slideshow, wherein two or more of plurality of indicated files have different file types, and wherein at least one of the indicated files is a multi-page file, and at least one of the selected plurality of files is a single page file; and automatically generate a slideshow from the plurality of indicated files including the two or more files having different file types and the at least one multi-page file and the at least one single page file, wherein one of the different file types is an image file type or a portable document format file type, wherein said automatically generate comprises, for each respective file of indicated files:

determine a file type for the file;

if the file type is determined to support multiple pages, determining a count of pages in the file, and if the count is greater than one, including in a sequential manner one or more pages of the file in the slideshow; and if the file type is determined not to support multiple pages, including the file as a single slide in the slideshow, wherein the image file type is determined to not support multiple pages;

including a transition in the slideshow between two pages of the multi-page file if the count of pages is determined to be greater than one.

27. The method of claim 1, wherein said automatically generating the slideshow from a plurality of files further comprises automatically displaying the plurality of files stored on a system memory device of the computing platform.

28. The method of claim 4, wherein said automatically generating the slideshow from a plurality of files further comprises automatically displaying the plurality of files stored on a system memory device of the computing platform.

29. The method of claim 7, wherein said receiving the indication from a user to display the plurality of indicated files further comprises receiving the indication from the user to display the plurality of indicated files stored on stored on a system memory device of the computing platform.

30. The apparatus of claim 24, further comprising a storage medium storing program instructions executable by the one or more processors to implement said receive a selection and said automatically generate a slideshow.

31. The apparatus of claim 25, further comprising a storage medium storing program instructions executable by the one or more processors to implement said receive a selection and said automatically generate a slideshow.

32. The apparatus of claim 26, further comprising a storage medium storing program instructions executable by the one or more processors to implement said receive an indication and said automatically generate a slideshow.

* * * * *